United States Patent [19]

Mizuno et al.

[11] Patent Number: 4,700,398
[45] Date of Patent: Oct. 13, 1987

[54] METHOD OF AND APPARATUS FOR DETECTING HEIGHTS OF POINTS ON SURFACE OF OBJECT

[75] Inventors: Hirotaka Mizuno; Fuminobu Komura, both of Yokohama, Japan

[73] Assignee: Hitachi, Ltd., Tokyo, Japan

[21] Appl. No.: 723,160

[22] Filed: Apr. 15, 1985

[30] Foreign Application Priority Data

Apr. 13, 1984 [JP] Japan .................................. 59-72771

[51] Int. Cl.$^4$ ................................................ G06 9/00
[52] U.S. Cl. ........................................ 382/1; 356/2; 356/3
[58] Field of Search ...................... 382/1; 356/2, 3, 12, 356/27; 250/558

[56] References Cited

U.S. PATENT DOCUMENTS

| | | | |
|---|---|---|---|
| 3,820,895 | 6/1974 | Mihail et al. | 356/2 |
| 4,206,612 | 5/1980 | Di Matteo et al. | 356/2 |
| 4,313,678 | 2/1982 | Colvocovesses | 356/2 |
| 4,525,858 | 6/1985 | Cline et al. | 382/1 |
| 4,539,701 | 9/1985 | Galbreath et al. | 382/1 |

OTHER PUBLICATIONS

Futamura et al., "Problem Analysis Diagram", JA-RECT, vol. 12, 1984, pp. 97–115.

Duda et al., *Pattern Classification and Scene Analysis*, pp. 44–49.

Barnea et al., "A Class of Algorithms for Fast Digital Image Registration", *IEEE Transactions on Computers*, Feb. 1972, pp. 179–186.

Primary Examiner—Leo H. Boudreau
Assistant Examiner—Joseph Mancuso
Attorney, Agent, or Firm—Antonelli, Terry, Wands

[57] ABSTRACT

Several properties are assigned to the regions of an image having light and shade and obtained by photographing a surface of an object. Several properties are also assigned to the regions of the picture, which are extracted on the basis of the first proper-assigning operation, and the boundary lines therebetween. The angles of inclination of these regions and the condition of the unevenness of the regions of the surface which are on these boundary lines are estimated by utilizing the relation between the above-mentioned properties and the direction of a light source. Thus, the relative elevation of the surface of the object is determined. The above-mentioned properties are determined with respect to images of the same object from different directions, and the properties thus determined of these images are compared to determine the corresponding points, which are utilized to determine the quantitative elevation of the surface.

8 Claims, 14 Drawing Figures

FIG. 11(a)

| REGION | REGION 54 | ----- |
|---|---|---|
| VALUE OF PROPERTY | SLOPE AGAINST THE SUN ="C" LIGHT SOURCE | ----- |

FIG. 11(b)

| BOUNDARY | BOUNDARY 66 | ----- |
|---|---|---|
| CONSITUENT POINT | POINT,-,-, | |
| LENGTH | 95 | |
| DIRECTION | 0.6 | |
| NEIGHBOR REGION | REGION 54, REGION 55, | |
| CONNECTED BOUNDARY | BOUNDARY 63, BOUNDARY 64, | |
| VALUE OF PROPERTY | VALLEY ="Z" | ----- |

FIG. 11(c)

| END POINT | END POINT 69 | ----- |
|---|---|---|
| CONNECTED BOUNDARY | BOUNDARY 61 BOUNDARY 62 BOUNDARY 65 | ----- |

METHOD OF AND APPARATUS FOR DETECTING HEIGHTS OF POINTS ON SURFACE OF OBJECT

BACKGROUND OF THE INVENTION

This invention relates to a method of and an apparatus for determining the heights of points on an object on the basis of image signals from a camera unit.

Conventional methods of determining the heights of points on an object include a method illustrated in FIGS. 1 and 2.

In order to determine the heights (elevation) of various points in the regions of a photographed surface of an object, a pair of homologous points 13, 14 are determined on two images 11, 12, which will hereinafter be referred to as a "stereo pair", obtained by photographing the same region of a surface from two positions in different directions. The lines of sight 23, 24 for camera units 21, 22, by which the images 11, 12 have been obtained as shown in FIG. 2, are then determined on the basis of the location of these two points 13, 14 on the images 11, 12. The intersection of these lines of sight 23, 24 is then determined, and the three-dimensional coordinates of a point 26, which corresponds to the pair of homologous points 13, 14, on the surface 25 of the object is computed on the basis of a triangle formed by the camera units 21, 22 and the point 26. The above is the procedure for attaining the mentioned object. The methods, which can be used in such a procedure, of determining homologous points on a stereo pair include the known correlation method and SSDA (Sequential Similarity Detection Algorithm) method disclosed in, for example, "A Class of Algorithms for Fast Digital Image Registration" by Barnea and Silverman, IEEE, Trans, Compt. Vol. C-21, pp. 179-186, February 1972. Each of these methods consists of the steps of superposing a template including a point 13, of which the determination of a corresponding point is desired, on one image of a stereo pair on the other, and calculating the similarity thereof while sliding the template, to thereby determine the corresponding point 14 which has a maximum similarity. With such methods, a corresponding point cannot be determined correctly when the two images are distorted because the points lie on an irregular surface.

SUMMARY OF THE INVENTION

An object of the present invention is to provide a three-dimensional form detecting method which is free from the above-mentioned drawbacks encountered in the conventional method, and which is used to calculate the elevation of a photographed region accurately on the basis of a stereo pair.

In order to achieve this object, the present invention provides a method consisting of extracting regions, boundaries between the regions, and junctions of the boundaries on each of a stereo pair, determining the regions, boundaries and junctions themselves and the connecting relation therebetween as features of the images, and then studying the correlation between the features of these two images so as to determine the homologous points thereon.

BRIEF DESCRIPTION OF THE DRAWINGS

FIGS. 11a-c is a diagram showing an example of expression of a description table in the embodiment.

DESCRIPTION OF THE PREFERRED EMBODIMENT

An embodiment of the present invention will now be described in detail. A process for determining the description of the surface of an object on the basis of an image thereof, a process for determining the elevation of the surface of the object qualitatively on the basis of the description, and a process for determining the elevation of the same surface quantitatively on the basis of the same description will be explained in the mentioned order.

Figure 1:
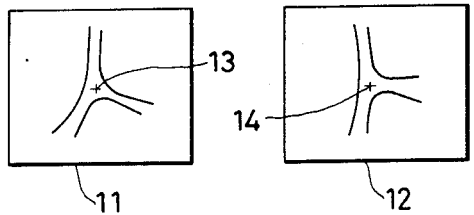
FIG. 1 shows an example of a conventional stereo pair and homologous points thereon.
Figure 2:
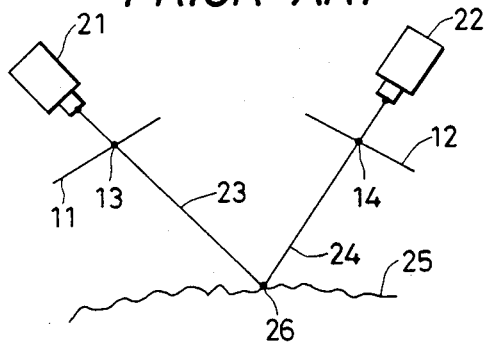
FIG. 2 illustrates the principle of calculating the three-dimensional coordinates of an object point on the basis of the homologous points on the conventional stereo pair.
Figure 3:
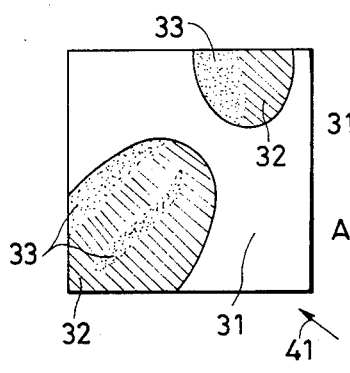
FIG. 3 shows an original image obtained in an embodiment of the present invention.

1. Process for determining the description of the surface of an object:

In this process, the picture elements of an image, which is obtained by imaging the same region of an object such as shown in FIG. 3, are assigned several kinds of properties (labels). Referring to FIG. 3, picture elements in hatched regions 32, a level or plain region 31 and dotted regions 33 form regions in which the picture elements have a substantially equal intensity, respectively, on an object which is irradiated with light emitted in the direction of an arrow 41 from a light source. The intensities of picture elements in the hatched regions 32, level region 31 and dotted regions 33 shall be assumed to decrease in the mentioned order when the surface of the object has uniform reflectance.

Figure 4:
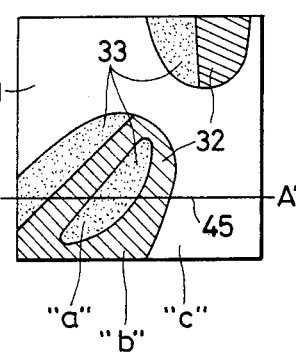
FIG. 4 shows a picture-element-assigned image obtained in the embodiment.
Figure 5:
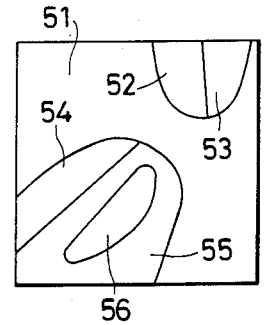
FIG. 5 shows a region-extracted image obtained in the embodiment.

The properties of the image on this picture are determined as follows. The regions 32 are determined as regions comprising picture elements of a high intensity, the region 31 as a region of an intermediate intensity, and the regions 33 as regions of the lowest intensity as shown in FIG. 4. The regions 32, in which the rate of irradiation of light diagonally is high, are inclined toward the light source, and the region 31 is level. The regions 33, in which the rate of irradiation of light diagonally is low, are inclined away from the light source. When the picture elements of the regions are classified under these three properties, three divisional images, for example, "a", "b", "c" of three values corresponding to the intensity can be obtained by using predetermined threshold values. The image may be classified into not only divisional images of three values but also divisional images of n values. Known image-classifying methods include the Best Method (disclosed in the reference literature, Duda, R. O. and Hart, P. E., "Pattern Classification and Scene Analysis", Wiley, 1973). Regions, each of which comprise picture elements of the same properties, are then extracted from the 3-value picture of FIG. 4. FIG. 5 shows the regions 51-56 thus extracted each of which comprises picture elements of a certain intensity.

Figure 6:
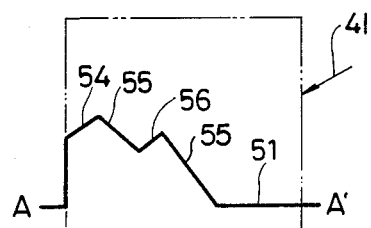
FIG. 6 is a sectional view taken along the line A—A' in FIG. 4.

If the relation between the values of properties of the regions, i.e. the level region 31, regions 32 inclined toward the light source, and regions 33 inclined away from the light source, which are shown in FIG. 4, and the direction in which the light is emitted from a light source is utilized, the condition of a cross section taken along the line 45 (A—A') in FIG. 4 can be assumed qualitatively as shown in FIG. 6.

As shown in FIG. 6, all of two adjacent regions border on each other so as to form an upwardly-projecting surface or a downwardly-projecting surface. Accordingly, the boundary line between two adjacent regions is given a value for one of two properties: a projection, a topographical ridge; or a recess, topographical valley.

Figure 7:
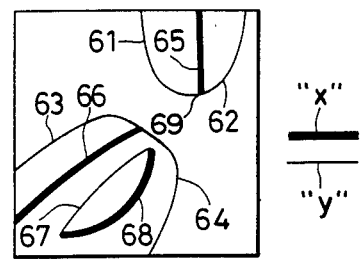
FIG. 7 shows a boundary-labeled-and-extracted image obtained in the embodiment.

FIG. 7 shows the results of extracting boundary lines between two adjacent regions, the boundary lines being classified into ridges designated by thick lines, having a property value "x", and valleys designated by thin lines, having a property value "y". Extraction and classification of boundary lines are carried out, for example, in the following order.

Figure 8:
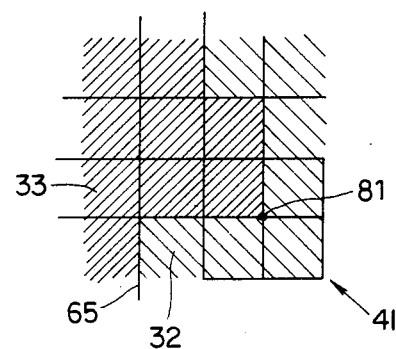
FIGS. 8 and 9 are enlarged views of the right upper portions of FIGS. 4 and 5.
Figure 9:
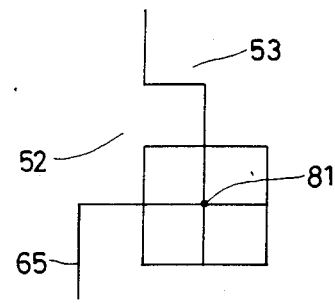

FIGS. 8 and 9 are enlarged views of the upper right regions of FIGS. 4 and 5, respectively, in which one square corresponds to one picture element in the image of FIG. 8 or FIG. 9. In the boundary line extracting process, the image of FIG. 4, which shows the results of classification, and the image of FIG. 5, which shows the results of division of regions, are scanned from the upper left regions thereof along a path between four adjacent picture elements. For example, at a point 81 in FIG. 9, four adjacent picture elements, i.e. an upper left element, an upper right element, a lower right element and a lower left element belong to regions 52, 53, 53, 53, respectively. Accordingly, the point 81 is determined as a constituent component of a boundary line 65 between the regions 52, 53. Referring to FIG. 8, these adjacent picture elements, i.e. the upper left element, upper right element, lower right element and lower left element are classified as elements belonging to region 33 inclined away from the light source, region 32 inclined toward the light source, region 32 inclined toward the light source and region 32 inclined toward the light source, respectively. The point 81 is determined as a part of an upwardly projecting boundary line, a ridge, on the basis of the values of properties ("a", "b" or "c") of these four picture elements and the direction 41 in which the light is emitted from the light source.

This process is carried out repeatedly for all points in FIG. 4 or FIG. 5 to derive a boundary line between two regions as shown in FIG. 7, and then to classify the boundary line into ridge segments or valley segments. The boundary line between the regions 56, 55 in FIG. 5 is looped, and consists originally of one boundary line. This boundary line is subjected to the ridge-and-valley classification shown in FIG. 8, to be further divided into two boundary lines 67, 68 as shown in FIG. 7.

With regard to the regions derived and classified, boundary lines and terminal points of the boundary lines, descriptions shown in FIGS. 11a, 11b and 11c are then prepared. The descriptions of the regions are the values, "a", "b" or "c", of characteristics shown in FIG. 11a. The descriptions of the boundary lines are the property values "x" or "y", array of constituent points, direction, length, number of two adjacent regions, and number of a boundary line which is connected at both of its end points. The number of a certain boundary line which is connected to an end point, the point to which the boundary line is connected, of another boundary line is also determined as shown in FIG. 11c. Owing to the descriptions thus prepared, the regions and boundary lines themselves and the relation therebetween can be derived easily.

Figure 10:
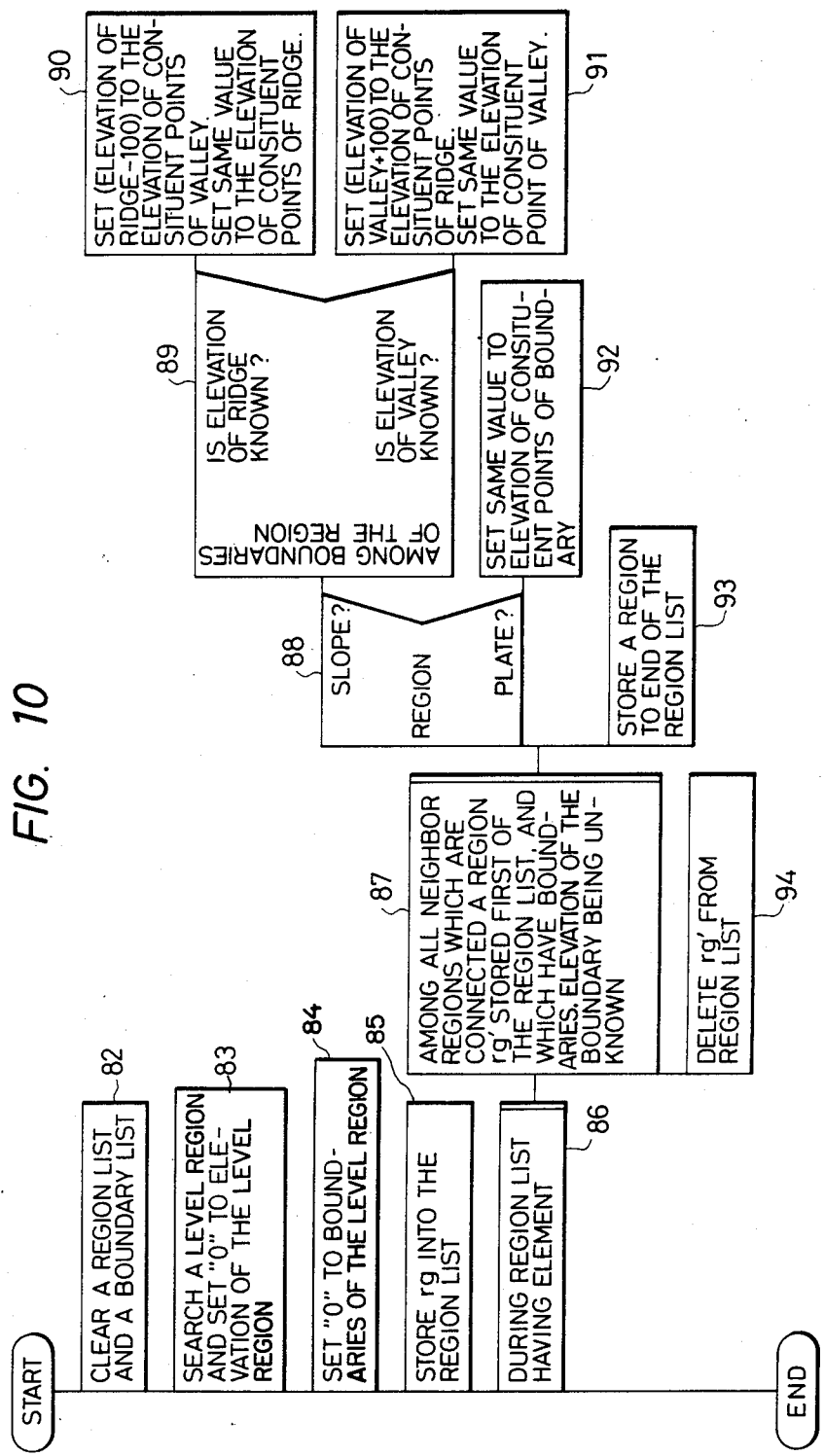
FIG. 10 is a flow chart of an operation for roughly assigning the height of a boundary according to the embodiment.

2. Process for qualitatively determining the elevation of the surface of an object:

The relative elevation of the surface of an object can be estimated on the basis of the description prepared of the regions and boundary lines. The estimation flow chart is shown in FIG. 10. The estimation process will be described taking as an example the surface shown in FIGS. 5 and 7.

The process shown in this flow chart is carried out after the lists of boundary lines and regions have been prepared.

First, lists of boundary lines and regions are cleared (step 82).

A level region is then delineated, and the height thereof is determined as zero. In the surface shown in FIG. 5, region 51 alone represents a level region, therefore, region 51 is selected, step 83.

The height of the boundary lines 61-64 on this level region is determined as zero which is equal to that of this level region, and these lines 61-64 are stored in the boundary line list (step 84).

The level region delineated in step 83 is stored in the region list, step 85.

A plurality of regions stored in the region list are taken out one by one, and each region is thereby subjected to the process in steps 87-94. This process is carried out repeatedly until the region list has been exhausted, step 86.

The regions, 52-55 in the example of FIG. 5, which border on the leading region, the level region 51 in the example of FIG. 5, taken out of the region list, and which have boundary lines the heights of which have not yet been determined, nor delineated, nor each of the regions is subjected to the process in steps 88-93, step 87.

The region selected in step 87 is evaluated as inclined or a level region, step 88.

When the results of the evaluation shows that the selected region is an inclined region, the boundary lines of this inclined region are checked to determine whether they include ridges the heights of which are known, or valleys the heights of which are known, step 89.

When there are ridges of a known height, the heights of other ridges on the boundary lines of the selected region are all determined to be equal to this known height, and the heights of valleys on the same boundary lines are all determined to be at a level corresponding to a height obtained by subtracting a predetermined value, for example, 100 from the known height of the ridges. These ridges and valleys, the heights of which are determined during this step, are stored in the boundary line list step 90. When there are valleys of a known height, the heights of other valleys on the boundary lines of the selected regions are all determined to be equal to this known height, and the heights of ridges on the same boundary lines are all determined to be at a level corresponding to a height obtained by adding a predetermined value, for example, 100 to the known height of the valleys. These valleys and ridges are stored in the boundary line list (step 91).

When the selected region is determined to be a level region in step 88 and there are boundary lines of a known height, the heights of other boundary lines of this region are all determined to be equal to this know height, and these lines are stored in the boundary line list (step 92).

These selected regions are inserted in the final part of the region list since steps 87-94 are also carried out afterward with respect to the regions bordering thereon, step 93.

Finally, the leading region, region 51 in the example is removed from the region list, step 94.

The processes in the above steps 87-94 are repeated as long as the region list has any data, so that the heights of the boundary lines 65, 66 are also stored in the illustrated example.

In case of region 56 in FIG. 5, which is surrounded by region 55, a height cannot be assigned to the boundary lines 67, 68 by the above-described system. In this case, the following processes, not shown, are required.

In the case where an object region is level with its surrounding region consisting of a slope, the heights of all the boundary lines of the object region representing a level surface are determined to be a half of the sum of maximum and minimum values of the heights of the boundary lines of the surrounding region, and the border lines, the heights of which were determined during this step, are stored in the boundary line list.

In the case where an object region and its surrounding region are both slopes, the heights of the ridges and valleys on which the object slope border are evaluated as: (maximum value of the heights of boundary lines of the surrounding region—minimum value of the heights of boundary lines of the surrounding region)$\times \frac{2}{3}$+the minimum value for the ridges, and (maximum value of the heights of boundary lines of the surrounding region—minimum value of the heights of boundary lines of the surrounding region)$\times \frac{1}{3}$+the minimum value for the valleys. The boundary lines are stored in the boundary line list.

At the end of these processes, the assignment of heights to all boundary lines is complete.

Assigning heights to the end points of the boundary lines is then done on the basis of the heights of the boundary connecting these points thus prepared, and the heights of points which constitute the boundary lines are set on the basis of the heights of the boundary lines and the heights of the end points. First, the height of the level region is applied to the height of the connecting points on the edge of the region corresponding to the level surface. With respect to the other connecting points, half of the sum of maximum and minimum values of the height of the boundary lines joining these connecting points is set. Then, the heights of the points on the boundary line are assigned on the basis of the heights of both end points of this boundary line and the boundary line itself so as to limit the variations in the heights of the points of the boundary lines. For example, if the height of a boundary line, the heights of the connecting points at both ends of the boundary line, and the number of points constituting the boundary line are 100, 0, 100 and n, respectively, 0, (100/n−1), (200/n−1), ..., $$\frac{(n-2)100}{n-1},$$

100 are taken to be the heights of the points from one end point to the other end point, respectively. In the case where these heights are 0, 100 and 0, respectively, the heights of the points, which are similarly determined, i.e. 0, (200/n−1), (400/n−1), ..., 100, 0 are adopted. The above are the treatments for assigning heights to the point constituting the boundary lines.

The heights of the points inside each region which are other than the boundary lines are then estimated. The relative height of the points inside the regions are calculated by carrying out a smoothing operation repeatedly as a height image, in which only the portions thereof that are on the boundary lines have point heights, and in which the height of the remaining points thereof is set to 0 or 50, is used as an initial value. Then, the values of all of the image elements of the height picture except the picture elements on the boundary lines thereof are replaced by an average value of their upper, lower, left and right pixel values (height) repeatedly until the intensity of each picture element in the height picture has been focused.

At the end of the process described up to now, the description of the surface of an object on the basis of one image, and the estimation of the relative elevation of the surface on the basis of the same image are complete.

3. Process for quantitatively determining the elevation of the surface of an object:

The descriptions, which are obtained in accordance with the illustration in FIG. 11, of the surface of an object are prepared in advance with respect to the stereo pair, and the quantitative elevation of the surface can also be determined on the basis of these descriptions. For this purpose, the two sets of descriptions of the surface of the object are compared. The descriptions, which are prepared with respect to the stereo pair, and which are similar to those shown in FIGS. 11a, 11b and 11c, are compared. The corresponding condition of the nodes, regions, boundary lines and connecting points, in the two sets of descriptions is determined as the properties of and the relation between, for example, the neighboring relation, the nodes are checked in such a way that the two sets of descriptions display no physical inconsistency. As a result, the corresponding relation between the positions of the connecting points on the two images becomes clear, and the three-dimensional coordinates of the connecting points can thereby be determined by using known triangulation techniques, i.e. the quantitative elevation of the surface of the object can be obtained.

Figure 12:
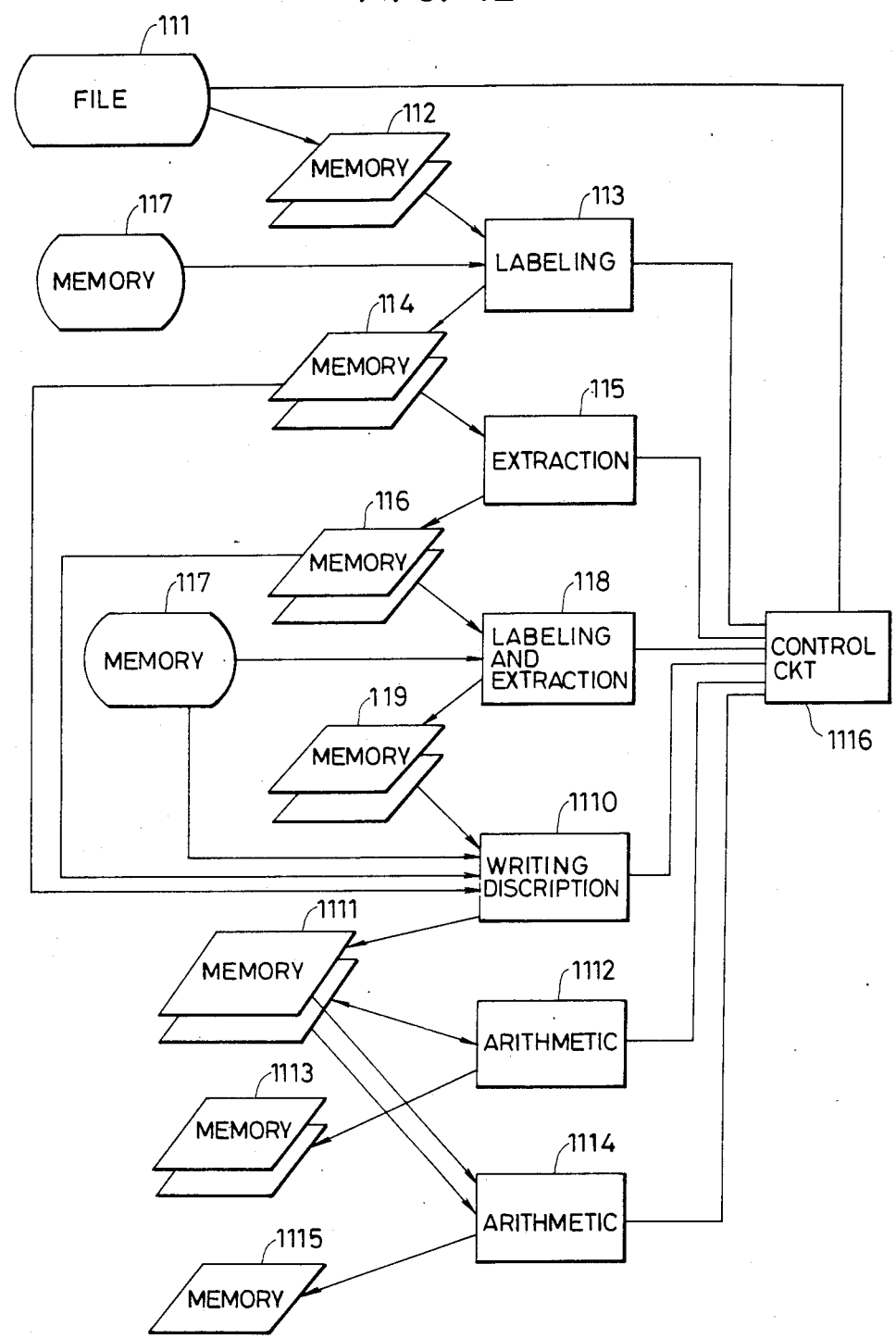
FIG. 12 is a general construction diagram of the embodiment.

FIG. 12 shows a construction of the ground configuration detecting system as used in the embodiment of the present invention. First, each image of a stereo pair in an image file 111 is registered in an image memory 112. These images are converted into image data the intensity of each point of which is one of three values, a, b and c, denoted level surfaces, slopes inclined toward the light source and slopes inclined away from the light source by a labeling unit 113, and the results are stored in an image memory 114. Training data for the labeling operation is input from a memory 117 into the labeling unit 113.

An image of the labeling results, which is stored in the memory 114, is input into a region delineating unit 115 and divided into regions. The resultant regions are delineated as closed regions, and an image with region numbers as shown in FIG. 5 is stored in a picture memory 116.

The image with region numbers and the data 117 on the photographing conditions including the radiation direction of the light are then input into a boundary line labeling and extracting unit 118, in which the boundary lines are classified into ridges and valleys, to which the values "x" and "y" are given, respectively. An image with boundary lines thus obtained is stored in an image memory 119.

A unit 1110 for preparing descriptions of regions, boundary lines and connecting points receives an image of the labeling results, an image of the region numbers, an image of the boundary lines and data on the photographing conditions to prepare descriptions of regions, boundary lines and connecting points. The descriptions thus obtained are stored in a memory 1111.

These descriptions may consist of expressions in the form of a collection of tables shown in FIG. 11 which have already been referred to. Let us consider, for example, the descriptions of boundary lines in FIG. 11b. The descriptions of one boundary line consist of the descriptions of the number 66 of the boundary line, the number of the constituent points, length, direction, numbers of adjacent regions 54 and 55, numbers of connected boundary lines at end points, boundary lines 63 and 64 at one end point and no boundary lines at the other end point, property values (ridges), and height (not determined).

In order that the relative elevation of a photographed surface of the object is determined, the descriptions referred to above of the regions, boundary lines and connecting points are read from a memory 1111 into a relative elevation calculating unit 1112, in which the relative elevation of the selected region is determined. A height image indicative of the relative elevation is output to a memory 1113, and the heights of the boundary lines and connecting points to the memory 1111.

When the descriptions of two pictures have been obtained in the memory 1111 after the above-described processes are carried out with respect to the two images, the descriptions are input into a quantitative elevation calculating unit 1114, in which the graphs indicating two sets of descriptions are compared while determining the matching elements of the region 121, boundary line 122 and connecting point 123. The determination of these matching elements is done so that no inconsistency occurs between these graphs with respect to the connecting relation between the regions, boundary lines and connecting points 121–123, all of which are expressed in arcs, and the properties of the nodes in the graphs. Comparison of these graphs renders clear the correlation between the connecting points in the two images. Consequently, the position of each connecting point in a three-dimensional space can be determined on the basis of the position pair thereof on the two images. The process of determining such a position is carried out by entering the photographing position with respect to, and the posture of, the images into a position-determining means, and processing the resultant data in accordance with the principle of triangulation. This process is widely known.

The three-dimensional coordinates (quantitative elevation) of the connecting points are stored in a memory 1115, and the correlation between the two sets of descriptions also are stored therein.

The operation of each part is controlled by a control unit 1116.

According to the present invention described above, the elevation, a three-dimensional form, such as the form of an uneven surface, which is the relative elevation of the surface of an object, can be determined even on the basis of one image which was obtained by photographing the surface of the object. When a stereo pair is used, the elevation of the surface of an object can be determined more accurately than in the case when a corresponding point is determined by directly comparing the images with each other. This improves the accuracy of determination of three-dimensional coordinates of a corresponding point.

What is claimed is:

1. A method of detecting the heights of points on a surface of an object, comprising the initial steps of photographing a surface of an object illuminated by a light source from one direction, converting said photographed image to an electrical signal, digitizing said electrical signal to obtain image data having arrays of integers, the method further comprising the machine implemented steps of:

assigning a plurality of first property values to picture elements of said image data on the basis of the intensities of said picture elements and the direction of the light from said light source, making a search on the basis of said assigned first property values for a plurality of regions having a group of picture elements of the same first property value, making a search for a plurality of boundary lines between a plurality of regions thus found out, assigning a plurality of second property values to said boundary lines on the basis of the direction in which the light is emitted from said light source during the photographing of said surface, estimating the heights of points, which constitute said boundary lines, on the basis of said assigned second properties, and estimating the heights of the points inside each of a plurality of regions, which are surrounded by said boundary lines, on the basis of the estimated heights of said boundary lines.

2. A method of detecting the heights of points on a surface of an object according to claim 1, wherein said first property values consist of three characteristic values, i.e., values of a slope inclined toward said light source, a level surface and a slope inclined away from said light source.

3. A method of detecting the heights of points on a surface of an object according to claim 1, wherein said second property values consist of two characteristic values, i.e. values for a valley and values for a ridge.

4. A method of detecting the heights of points on a surface of an object according to claim 3, wherein the estimating of the heights of points constituting said boundary lines is done by assigning the same height to all of the other boundary lines, the heights of all of which are unknown but have the same kind of second property value as the boundary lines having an already-known height, among a plurality of boundary lines surrounding a plurality of regions, assigning a height, which is different from said already-known height by a predetermined level, to said other boundary lines having other kind of second property value, and correcting the height of the points, which constitute said boundary lines, in such a manner that a plurality of boundary lines to which heights have been assigned are smoothly connected.

5. A method of detecting the heights of points on a surface of an object, comprising the initial steps of photographing the surface of an object from two different directions, where said object is illuminated by a light source from one direction, converting said photographed image to an electrical signal, digitizing said electrical signal to obtain two image data having arrays of integers, the method further comprising the machine implemented steps of: assigning to picture elements, which have been obtained in said photographic step, a plurality of first property values on the basis of the intensities of said picture elements and the direction of the light from said light source, making a search on the basis of said assignment first property values for a plurality of regions in each of said two image data, which have a group of picture elements of the same first property value, making a search for a plurality of boundary lines between a plurality of detected regions with respect to each of said two image data, assigning a plurality of second property values to a plurality of detected boundary lines on each of said two image data on the basis of the direction in which the light is emitted from a light source for said photographing step, determining corresponding points on each of said two image data on the basis of said second property values, and determining the heights of the corresponding points on the surface of said object on the basis of said corresponding points and the location of viewing points for said photographing.

6. A method of detecting the heights of points on a surface of an object according to claim 5, wherein said first property values consist of three characteristic values, i.e., values for a slop inclined toward said light source, a level surface, and a slope inclined away from said light source.

7. A method of detecting the heights of points on a surface of an object according to claim 5, wherein said second property values consist of two characteristic values, i.e. values for a valley and a ridge.

8. An apparatus for detecting the heights of points on a surface of an object illuminated by a light source from one direction comprising imaging means for photographing said surface from two different directions to produce two photographed images, converting means for converting said images to electrical signals, digitizing means for digitizing said electrical signals to obtain two image data having arrays of integers, a first memory for storing therein said image data, a first labeling means for reading said image data from said first memory and for classifying the picture elements on the basis of first property values, a first search means for searching on the basis of the results of the classification of said picture elements for a plurality of regions which have a group of picture elements of the same first property value, a second search means for searching for a plurality of boundary lines between a plurality or regions detected by said first search means, a second labeling means for assigning second property values to a plurality of boundary lines, which have been selected by said second search means, on the basis of the direction in which the light is emitted from said light source during the photographing of said surface, a means for estimating the heights of the points, which constitute said boundary lines, on the basis of said second property values assigned by said second labeling means, and then the heights of the inner inside each of a plurality of regions, which are surrounded by said boundary lines, on the basis of said estimated heights of said points constituting said boundary lines, and a means for determining a pair of corresponding boundary lines on said two image data of said object, on the basis of said second property values obtained by said second labeling means, and further determining a pair of corresponding connection points on said corresponding boundary lines, and then determining the height of said corresponding points on the surface of said object on the basis of said corresponding points thus determined and location of viewing points for said photographing said object.

* * * * *